Figure 1:
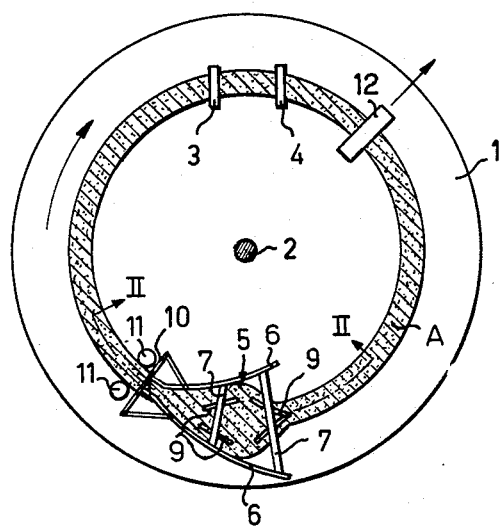

Nov. 1, 1960   B. S. SIESWERDA ET AL   2,958,777
APPARATUS FOR MEASURING PROPERTIES OF GRANULAR MATERIAL
Filed March 31, 1959

INVENTORS:
Bauke S. Sieswerda and
Aart L. van der Mooren

Cushman, Darby & Cushman
ATTORNEYS

United States Patent Office 2,958,777
Patented Nov. 1, 1960

2,958,777

APPARATUS FOR MEASURING PROPERTIES OF GRANULAR MATERIAL

Bauke S. Sieswerda, Geleen, and Aart L. van der Mooren, Hoensbroek, Netherlands, assignors to Stamicarbon N.V., Heerlen, Netherlands Filed Mar. 31, 1959, Ser. No. 803,121

Claims priority, application Netherlands Apr. 3, 1958

8 Claims. (Cl. 250—53)

The present invention relates to measuring devices and more particularly to an apparatus for measuring properties of granular materials by means of electromagnetic or corpuscular radiation, in which material to be tested is fed onto a disc rotatable about a vertical shaft and passed under a source of radiation after being levelled.

An apparatus of this kind for measuring the Roentgen ray absorption, to determine the ash content of a sample of coal, is disclosed in co-pending Sieswerda et al. application, Serial No. 452,896 filed August 30, 1954 and issued November 24, 1959 as Patent No. 2,914,676. Depending upon the ash content of the coal sample thus determined, for instance, from the purified coal fraction separated in a coal washer in a given period, the adjustment of the washer, for instance with regard to the specific gravity of the separating suspension, is so controlled that a coal fraction is obtained whose ash content is constant within certain limits.

In order to insure a useful control, the ash content should be determined as fast as possible. The physical method, according to which the sample to be tested is irradiated, with Roentgen rays, and the absorption or diffuse scattering of this radiation by the material to be tested—which is a measure of the ash content of this material—is measured, is preferred to the time-consuming chemical method, which involves combustion of the sample and determination of the weight of the incombustible residue.

One of the advantages of the determination of the ash content by measuring the diffuse scattering of the radiation incident upon the material to be examined, as compared with a determination of the ash content by measuring the absorbed radiation, is that the thickness of the layer formed by the sample to be tested does not influence the result of the measurement. Thus, it is not necessary to subject an accurately weighed quantity of the sample to irradiation, nor to spread the sample in such a thin layer, or to use radiation of a hardness sufficient to insure that at least a measurable amount of the radiation will penetrate the sample and the disc on which it lies. However, on the other hand, by measuring the diffuse scattering, it is possible to obtain an indication of the nature and the composition only of the surface layer of the sample to be tested. If the sample is not homogeneous, so that the composition of the material near the surface differs from the composition in other places, the measured value will deviate from the actual value.

An object of the present invention is to provide an apparatus which makes it possible, even with samples which are admixed to a certain extent, to obtain a value which is representative of the whole mixture fed on to the sample disc.

Another object of the present invention is the provision of an apparatus of the type described including means, preferably in the form of one or more plow-shaped members and a leveller for mixing the material on the disc and subsequently leveling it before it is passed under the radiation source.

Still another object of the present invention is the provision of apparatus of the type described which is simple in construction, efficient in operation and economical to manufacture and maintain.

These and other objects of the present invention will become more apparent during the course of the following detailed description and appended claims.

The invention may best be understood with reference to the accompanying drawings wherein an illustrative embodiment is shown.

Figure 2:
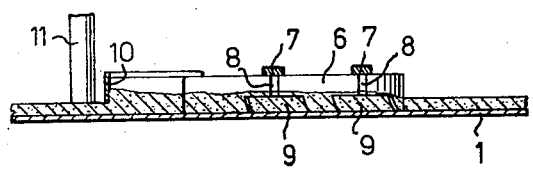

In the drawings:

Figure 1 is a somewhat schematic top plan view of an apparatus embodying the principles of the present invention; and Figure 2 is an enlarged fragmentary cross-sectional view taken along the line 2—2 of Figure 1.

Referring now more particularly to the drawings, there is shown an apparatus embodying the principles of the present invention which includes a disc 1 suitably fixed to a vertical shaft 2, which is rotatably supported and which can be rotated by a driving mechanism (not shown in the drawing) in the direction indicated by the arrow. The diameter of the disc is, for instance, 24 cm. and the number of rotations 1 per minute. Positioned above the disc is a radiation source 3 which preferably constitutes a conventional Roentgen ray tube or a radio active preparation. Disposed adjacent the radiation source 3 is a detector 4, which receives the radiation scattered by the material on the disc and converts it into a signal in a conventional way. In this example, the reflection is measured, while during the measurement disperse scattering takes place.

A sample of the material to be tested, for instance washed coal, is admitted to the disc in a finely divided state by any suitable means at position A. A very short distance from position A in the direction of rotation of the disc, a mixing device 5 is provided, which is made up of two walls 6 converging in the direction of rotation of the disc. At their upper edges the walls are interconnected by strips 7 to which vertical bars 8 are secured in depending relation. Fixed to the lower ends of the bars are plow-shaped plates 9, having their lower edges in contact with the upper surface of the disc.

As shown in the drawings there are four plow-shaped plates 9 provided, the plates being arranged in pairs. One pair of plates which first engage the material is disposed in diverging relation with respect to each other in the direction of rotation of the disc. The leading edges of the plates are disposed in contiguous relation. As shown, the leading edges engage the central portion of the material travelling on the disc and plow the same over by an action quite similar to that of a normal mold board plow. Moreover, the height of the plates may be such that some of the material will pass over the same. The other pair of plow-shaped plates 9 is mounted in converging relation with respect to each other in the direction of rotation of the disc. Moreover, these plates are preferably mounted in spaced relation with respect to each other. It will also be understood that the walls 6 also cooperate in the mixing of the material. As shown, the material turned over by the first pair of plates 9 is directed toward the plates 6 and the latter serve to direct the same toward the second pair of plates 9 where additional mixing takes place. After the material passes the second pair of plates the walls 6 neck down into a funnel-like configuration.

The material which leaves the funnel passes under a leveller 10, which levels the sample so that the surface to be irradiated has the smoothness required for carrying out the measurement. Disposed adjacent the leveller 10, is a pair of suction devices 11, of any suitable construction, which serve to remove the surplus material, A third suction device 12 is positioned between the deflector 4 and the feed position A to remove the whole sample if so desired. Both in discontinuous and continuous measurements an excess of material is supplied, the suction devices 11 being provided to control the amount of material to be left on the disc.

By plowing the sample before it is irradiated the material is repeatedly mixed and turned, so that the surface layer of the sample is made up of different parts of the sample each time it passes under the radiation source. After the sample has passed under the radiation source a few times, the average value of the signal emitted by the detector for the radiation scattered by the material will be a fairly accurate measure of the ash content of the sample.

The apparatus of the present invention is particularly suitable for carrying out discontinuous measurements wherein the amount of material on the disc is increased until the entire sample is on the disc, and then, when all the material has passed under the radiation source a few times, the whole sample is removed.

In the case of discontinuous measurements, the amount of the sample must be such that it just fills the sample disc. If the sample is too small, the layer will be too thin and a faulty recording will result. Conversely, if too large an amount of sample is present there would be no room on the disc and portions thereof would fall off the disc. Under these conditions the sample would no longer be representative of the material to be tested.

A sample which is representative of the main stream is proportional to the amount of the main stream. When the amount of the main stream varies, this will also be the case with the samples drawn from it. In order to insure that enough material will be deposited on the disc in all cases, there should be a sufficient amount of the sample when the amount of the main stream is smallest. In the case of larger main streams, the sample should be reduced so that it is representative of the main stream. The sample should not be reduced according to a constant ratio but to a constant quantity, so that the normal type of sample-splitting devices, which reduce according to a constant ratio, are of no use. A normal overflow arrangement at the point where the sample is drawn, or further on in the sample stream, usually produces an incorrect sample, for instance, the proportion of large particles to small is altered in favor of the small ones.

It has further been found that in discontinuous measurements the sample would in some cases have to be much greater than the amount the disc can carry so that, for a given size of the underground particles, the sample might still be representative of the material contained in the main stream. A larger disc, however, is unpractical and further the formation of a too thin layer when the main stream is small. For this reason, the amount of the material is reduced to a constant value, preferably at a point between the above-mentioned treatments and the radiation, in such a way that the resulting sample is representative of the main stream. The surplus material can be discharged by means of one or more suction devices or levellers.

In discontinuous measurements the supply of material is stopped at a given moment, after which the disc will still rotate for as long as is necessary to carry out an accurate measurement. During these additional rotations the suction devices 11 no longer remove material, since the correct amount of material is present on the disc.

After the sample has been irradiated, it passes again through the mixing device 5 in which it is plowed so that other particles of the sample get into the surface layer. When the sample has been treated a few times in this way, the ash content of the sample can be derived fairly accurately from the average value of the signal emitted by the detector. Before the disc is stopped the device 12 removes the entire sample.

The apparatus of the present invention is of advantage in both discontinuous and continuous measurements. In both cases, the amount of the sample may be made such that it is always representative of the main stream. After the material has been mixed on the disc some of it is discharged so that the sample remains representative. In a discontinuous measurement, the amount of the samples may be such that when the main stream is small, the layer on the disc is sufficiently thick and when the main stream is large, the sample is partly discharged, in such a way that it remains representative of the main stream. In a continuous measurement, there is always the same amount of material on the disc even when the main stream is stopped for some time, since the material is not removed completely after it has passed under the radiation source, which is the normal practice. In that case, the reading remains constant until the main stream begins to move again, so that in the recording there is no discontinuity which is in conflict with reality.

In continuous measurements the material is supplied continuously. The suction devices 11 continuously remove any superfluous material. The suction device 12 is not used and may therefore be eliminated. When the supply of material is stopped there is no surplus material to be removed by the suction devices, so that the section of the stream of material is maintained and no deviations are caused in the recording.

It will be understood that the drawings and above description of the construction are somewhat schematic and that suitable means must be provided for mounting structural elements 6—9 of the mixing means 5 in a fixed position with respect to the rotating disc 1. Similar stationary mounting means must also be provided for the suction devices 11 and 12, the radiation source 3, detector 4 and material feeding means at station A. Of course, the exact construction of these latter elements themselves may be in accordance with conventional practices.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. Apparatus for measuring properties of granular material comprising a source of invisible radiation, conveyor means mounted for movement in an endless path and having upwardly facing surface means for receiving material to be measured and for carrying the same in continuous layer formation under said radiation source, detector means for measuring the diffuse scattering of the radiation incident upon the material to be measured, and means disposed with respect to said conveyor means in a position to engage the material thereon prior to its passage under the radiation source for mixing the material in said continuous layer formation and then reforming the same into layer formation so that different portions of the material will constitute the upper surface of the layer during different passes under said radiation source.

2. Apparatus as defined in claim 1 wherein said material layer mixing and reforming means comprises a plurality of plow-like blades mounted in a stationary position above said conveyor means surface means to engage the material carried thereby.

3. Apparatus as defined in claim 2 wherein said plow-like blades are disposed in pairs spaced in the direction of movement of said conveyor means, the first pair being disposed in diverging relation with respect to each other in the direction of movement and having their leading edges joined, the second pair converging with respect to each other in the direction of movement and being spaced apart.

4. Apparatus as defined in claim 2 wherein a pair of spaced walls are disposed on opposite sides of said plow blades, said walls converging in the direction of movement of said conveyor means.

5. Apparatus as defined in claim 4 wherein said walls at the converging ends have secured therebetween a leveler bar disposed with its lower surface in spaced relation to said conveyor means surface means.

6. Apparatus as defined in claim 5 wherein means are provided adjacent said leveler bar for removing excess material from opposite sides of the layer thus formed.

7. Apparatus as defined in claim 6 wherein a pair of suction devices are provided adjacent said leveler bar for removing excess material from opposite sides of the layer thus formed.

8. Apparatus as defined in claim 2 wherein means is provided adjacent said material layer mixing and reforming means for removing excess material from opposite sides of the layer thus formed.

References Cited in the file of this patent

UNITED STATES PATENTS

| | | |
|---|---|---|
| 2,860,252 | Dijkstra | Nov. 11, 1958 |
| 2,861,188 | Dijkstra | Nov. 18, 1958 |
| 2,914,676 | Dijkstra | Nov. 24, 1959 |

FOREIGN PATENTS

| | | |
|---|---|---|
| 793,301 | Great Britain | Apr. 16, 1958 |